(12) United States Patent
Newman et al.

(10) Patent No.: US 9,832,294 B1
(45) Date of Patent: Nov. 28, 2017

(54) PHONE CASE WITH INSECTABLE SECONDARY HOUSING

(71) Applicants: Tyler W. Newman, San Rafael, CA (US); Mitchell Alan Newman, Novato, CA (US)

(72) Inventors: Tyler W. Newman, San Rafael, CA (US); Mitchell Alan Newman, Novato, CA (US)

( * ) Notice: Subject to any disclaimer, the term of this patent is extended or adjusted under 35 U.S.C. 154(b) by 0 days.

(21) Appl. No.: 14/999,469

(22) Filed: May 12, 2016

Related U.S. Application Data

(60) Provisional application No. 62/283,869, filed on Sep. 15, 2015.

(51) Int. Cl.
*H04M 1/00* (2006.01)
*H04M 1/02* (2006.01)
*H04B 1/3888* (2015.01)

(52) U.S. Cl.
CPC ........ *H04M 1/0254* (2013.01); *H04B 1/3888* (2013.01)

(58) Field of Classification Search
None
See application file for complete search history.

(56) References Cited

U.S. PATENT DOCUMENTS

2015/0272215 A1* 10/2015 Esses .................... A24F 47/008
320/103
2016/0234356 A1* 8/2016 Thomas ............... H04B 1/3888

* cited by examiner

*Primary Examiner* — Idowu O Osifade
(74) *Attorney, Agent, or Firm* — Christopher Peil; Law Office of Christopher Peil

(57) ABSTRACT

A phone case with a secondary housing retainer attached to the underside of the phone case. The secondary housing retainer can receive a rectilinear secondary housing that can act as a cigarette holder, wallet, cosmetic holder or battery charging unit. The secondary housing includes a hinged lid that can be opened even when the secondary housing is within the housing retainer. A third housing built into the underside of the cell phone retaining case has a hinged lid allowing the outermost panel to open or close. The third housing has a triangular cross section. In a second embodiment the secondary housing is a removable cosmetic tray that is covered by a hinged cover plate.

9 Claims, 15 Drawing Sheets

PHONE CASE WITH INSECTABLE SECONDARY HOUSING

CROSS REFERENCE TO RELATED APPLICATIONS

This application claims benefit of U.S. provisional patent application Ser. No. 62/283,869, dated Sep. 15, 2015.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of cell phone cases and more specifically to phone case with insertable secondary housing.

Phone cases for the protection of cell phones is a well-known product around the world. It is highly recommended that cell phone users encase their phones so that they have less of a tendency to break when dropped or otherwise abused. Many people also carry other items in their pockets or purses, including cigarette packs, wallets, cosmetic cases, keys or phone charging modules. It would be helpful of there were a secondary compartment attached to the underside of a phone case that would be capable of holding one or more of the above mentioned articles.

To this end, a number of people have designed multipurpose cell phone cases. These include:

Chinese patent application CN2485877 showing a cell phone case with an additional hollow housing for holding other items. This patent has lapsed due to non-payment of fees.

Chinese patent application CN1949796 discloses a cell phone case with an area for cigarettes. This application has been withdrawn.

U.S. Pat. No. 7,431,161 discloses a cosmetic carrier attached to a cell phone case.

U.S. Pat. No. 7,146,184 shows another design for a cell phone case with integral cosmetic pack.—a mirror is included.

Patent application 2009/0166247 shows a smart phone case with a cosmetic compartment. This patent was never issued.

Patent application 2012/0264491 shows a storage case attached to the back side of a cell phone. The storage case has room for face powder, lipstick and a brush. This patent was never issued.

U.S. Pat. No. 8,485,404 is a smart phone case with a compartment to hold ear-buds and wires.

Design patent—D688,655 is a phone case with a wallet accessory. This is for the shape only, not for the function.

Patent application 2013/0220847 shows a protective case for a cell phone that includes a rear compartment that can store a cigarette lighter, W\USB flash drive, earphones or other articles. This patent has not issued.

Patent D705,763 shows a phone case with lighter—but it is for the shape only—not utility.

U.S. Pat. No. 8,833,379 shows a container attached to a cell phone for holding items such as cosmetics.

U.S. Pat. No. 8,979,526 shows a cell phone cover with integrated lighter which is battery powered.

U.S. Pat. No. 8,967,377 shows a case for a phone which has a plurality of storage compartments including a foldable lens cover.

The sited patents and patent application show us that the concept of a cigarette case and lighter combined is in the public domain based on U.S. Pat. No. 2,529,150. Several of the above patents talk about some sort of cosmetic case attached to a phone case. One Chinese patent application talks about a combination phone case and cigarette holder— but this patent has never issued. The idea is now public because of the publication of the application.

However, none of the patents has talked about including a lighter and a holder for cigarettes in one phone case. Additionally, no one has talked about the idea of having a common housing size for inserting or removing a uniformly sized case, each capable of holding different items such as a cigarette holder/lighter, a cosmetic case and a wallet case. Furthermore, none of the sited patents include the addition of a third integrated case that is triangular in cross section and can hold small items such as keys. Additionally, none of the sited patents show a secondary case that can both be removable and replaceable, and also be able to open the lid of the secondary case without removing the secondary case from its holder located under the standard phone case. Finally, none of the above patents shows a phone case that can accept a combination of cigarettes and a cigarette lighter where the cigarettes and lighter are easily accessible without having to remove the secondary case from the case retaining portion.

BRIEF SUMMARY OF THE INVENTION

The primary object of the invention is to provide a phone case that includes an attached secondary housing retainer that can receive a secondary housing.

Another object of the invention is to provide a phone case where the secondary housing includes a hinged lid that can be easily opened while the secondary case is within its housing retainer.

Another object of the invention is to provide a phone case with secondary housing where the secondary housing has a uniform shape that can act as a cigarette holder, wallet, cosmetic case or a holder for other articles such as gum or candy.

A further object of the invention is to provide a phone case with secondary housing that holds cigarettes a lighter and a cigarette dispensing mechanism and where the cigarettes and lighter can be accessed without removing the secondary housing from its retainer.

Yet another object of the invention is to provide a third housing fixedly attached to the underside of a phone case which is triangular in cross section and can hold small items such as keys.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a phone case with insertable secondary housing comprising: a primary cell phone retaining case, a rectilinear secondary housing, said secondary housing including a hinged lid, a secondary housing receiving chamber fixedly attached to the underside of said primary cell phone retaining case, a third housing fixedly attached to the underside of said cell phone retaining case, said third housing having a hinged lid allowing said outermost panel to open or close, said third housing having a triangular cross section, and said secondary housing lid capable of being opened while said secondary housing is retained within said secondary housing receiving chamber.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
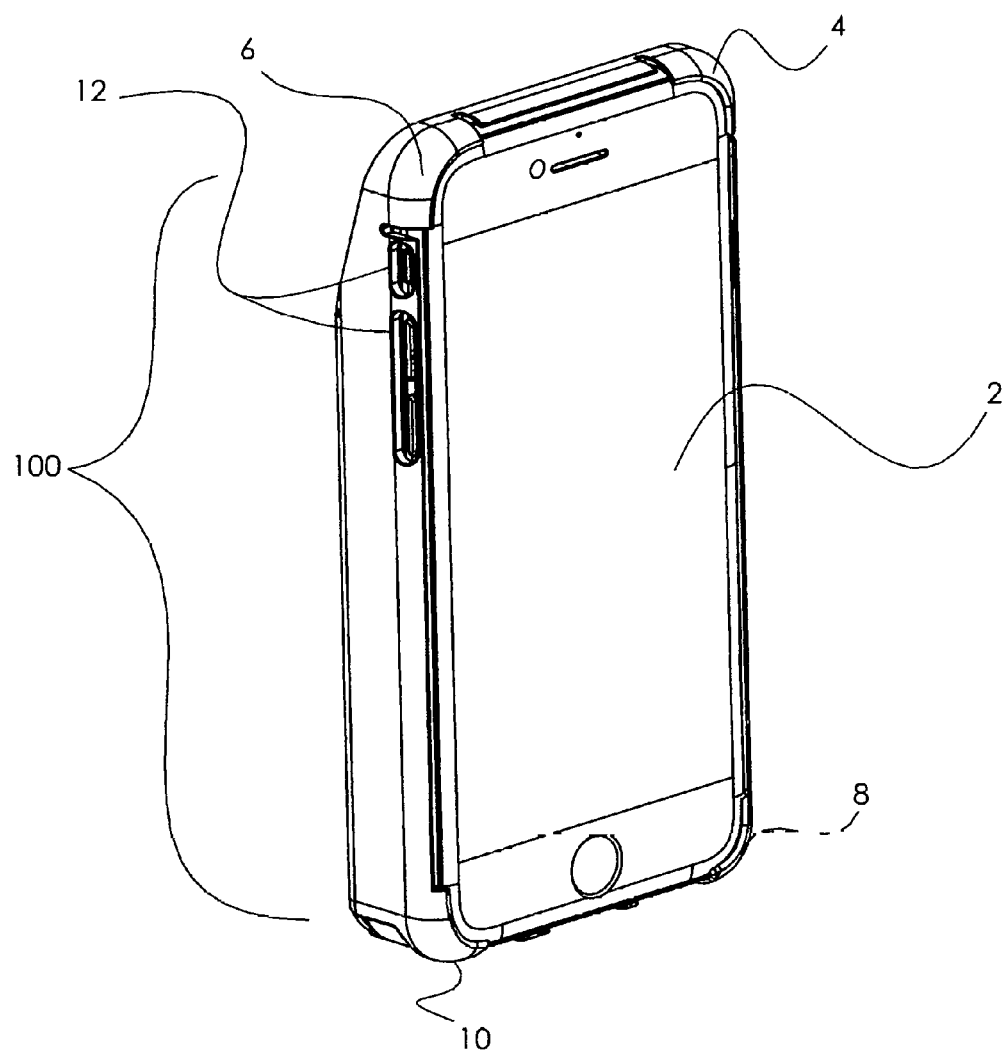
FIG. 1 is a perspective view of the invention showing the side of the housing that retains a typical cell phone.

Referring now to FIG. 1 we see a perspective view of the invention 100 where a primary housing is holding a typical Cell phone 2. The phone 2 is held in place by primary housing resilient corner clips 4, 6, 8, 10. The side of the case 100 includes typical cutouts 12 for accessing cell phone controls. The case 100 is thicker than the typical cell phone case because it includes a secondary box retaining portion 22 formed by side walls 80, 90 shown in FIGS. 2 and 8.

Figure 2:
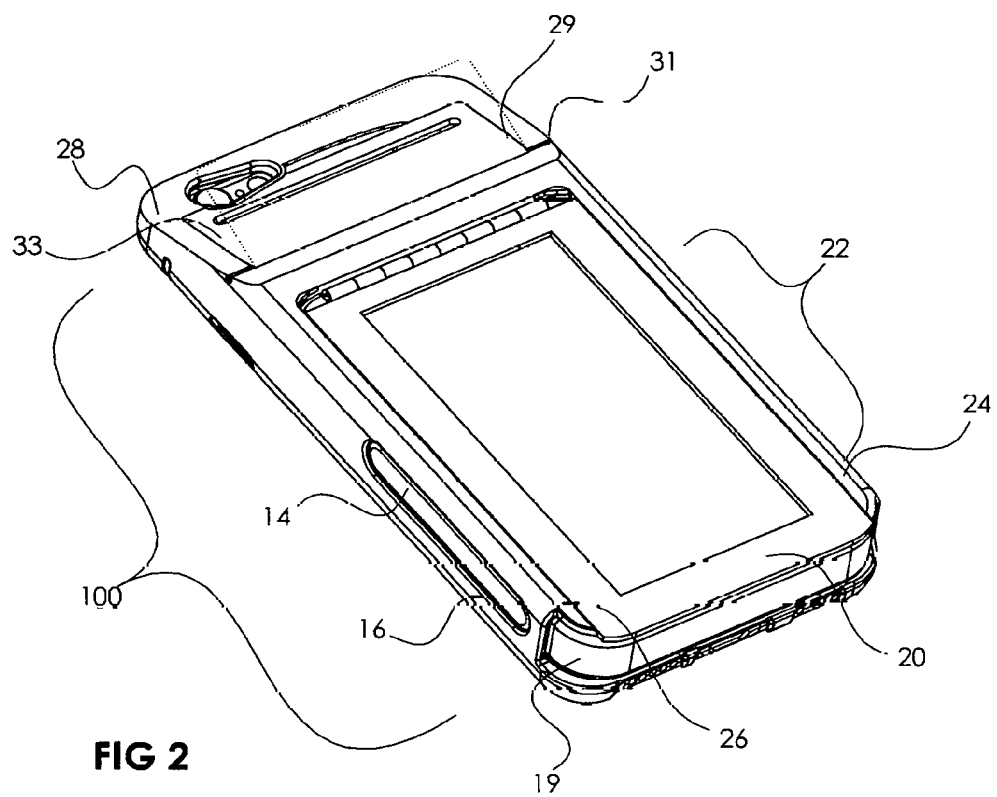
FIG. 2 is a perspective view of the invention showing the reverse side of the cell phone case that includes a secondary housing retainer that holds a secondary housing.
Figure 5:
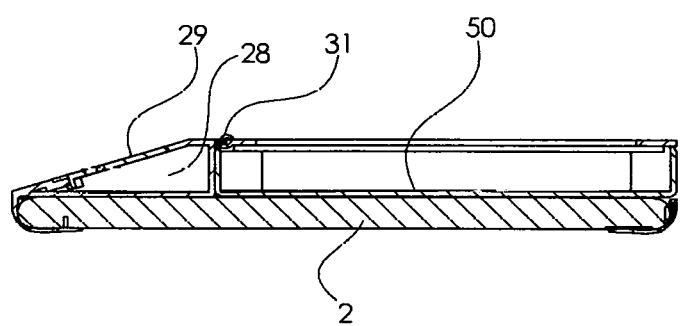
FIG. 5 is a longitudinal cross section of the invention.

FIG. 2 is a perspective view of the invention showing the underside of the phone case 100 where secondary box retaining portion 22 includes inwardly facing flanges 24, 26 that slidably retain a secondary box 20 which, in this case, is designed for holding cigarettes, a cigarette dispensing mechanism and a cigarette lighter, as will be explained below. A third storage compartment 28 is formed in the space between the bottom of cell phone 2 and the end of case 20 forming a triangular cross section as shown in FIG. 5. Lid 29 can be lifted via hinge member 31 revealing the triangular holding space inside 33 which can hold small items such as keys.

Figure 3:
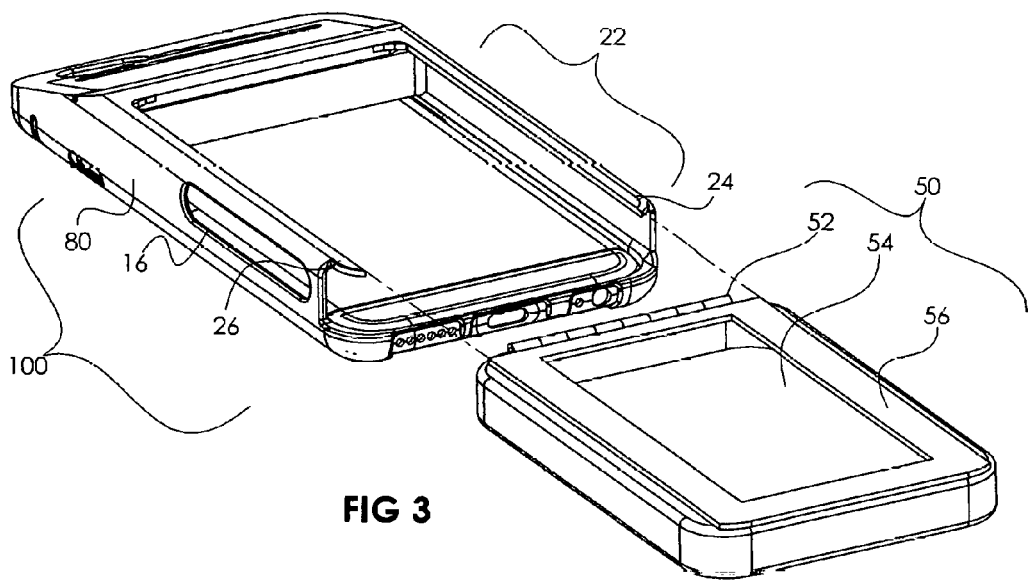
FIG. 3 is an exploded view showing the secondary housing about to be inserted into the secondary housing retainer.

FIG. 3 is an exploded view showing a secondary case 50 ready to be inserted into the case receiving portion 22 of invention 100. The secondary box or case 50 includes a hinged 52 lid 56 which can be lifted even when the case 50 is inserted into the main housing 100. The case 50 is a consistent size and can be customized within to act as a wallet, or cosmetic case, or cigarette case 20. The lid 56 includes a transparent center panel 54 so that the contents of the case 50 can be viewed. In the example of a wallet, the clear panel 54 can reveal an identity card such as a license 56 as shown in FIG. 4.

Figure 4:
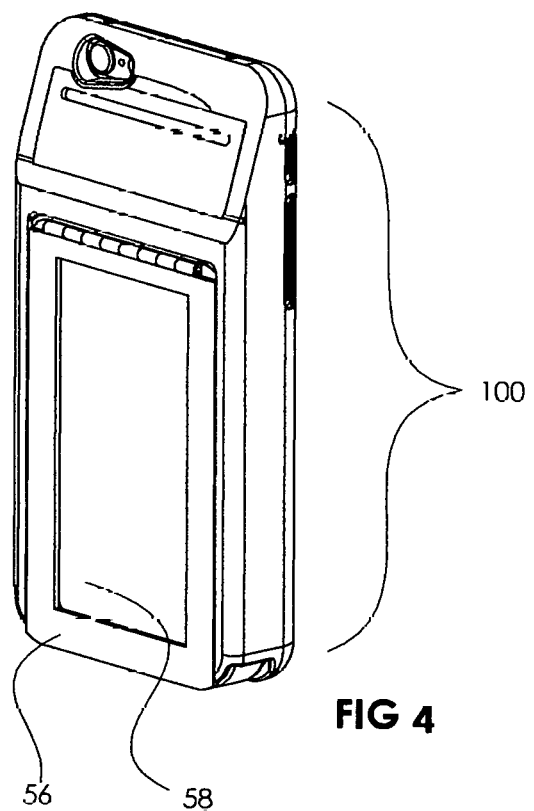
FIG. 4 is a perspective view with the wallet version of the secondary housing inserted into the housing retainer.

FIG. 4 also shows that the hinged panel 56 can be lifted without needing to remove case 50 from the retaining portion 22 of the phone case 100.

FIG. 5 is a longitudinal section view that bisects the invention 100. Phone 2 is shown at the lower primary portion and case 50 is shown in the upper portion 22. To reduce overall thickness of the main case 100, the back surface of the phone 2 acts as the retaining wall for the underside of case 50 thereby eliminating the thickness of one wall. Triangular third storage case 28 can be seen as well as lid 29 and hinge 31.

Figure 6:
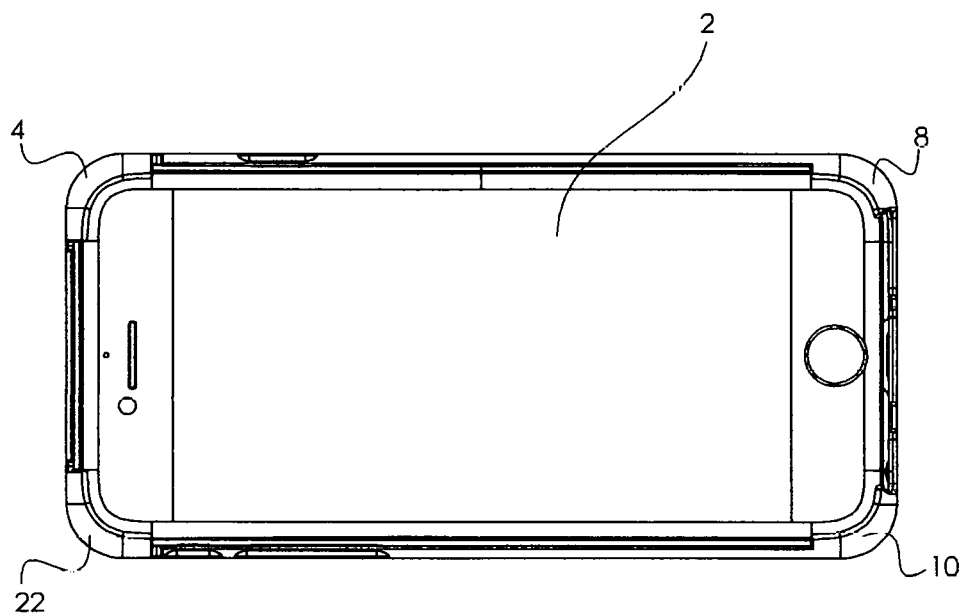
FIG. 6 is a front plan view of the invention.

FIG. 6 is a top plan view of the invention 100 with a typical cell phone 2 in place.

Figure 7:
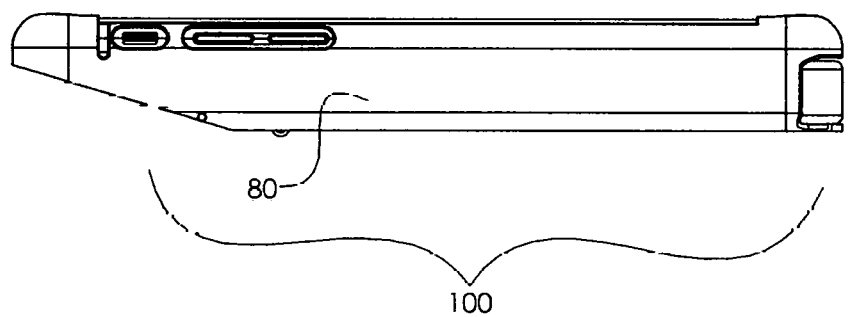
FIG. 7 is a right side view of the invention.

FIG. 7 is a right side view of the invention 100 showing right side 80.

Figure 8:
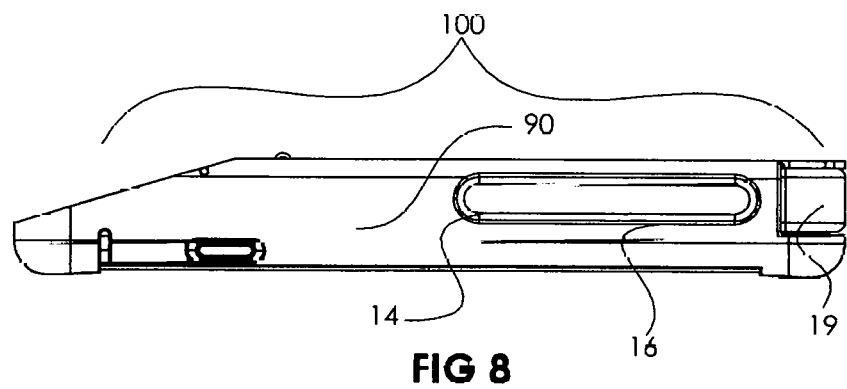
FIG. 8 is a left side view of the invention.

FIG. 8 is a left side view of the invention 100 showing left side 90.

Figure 9:
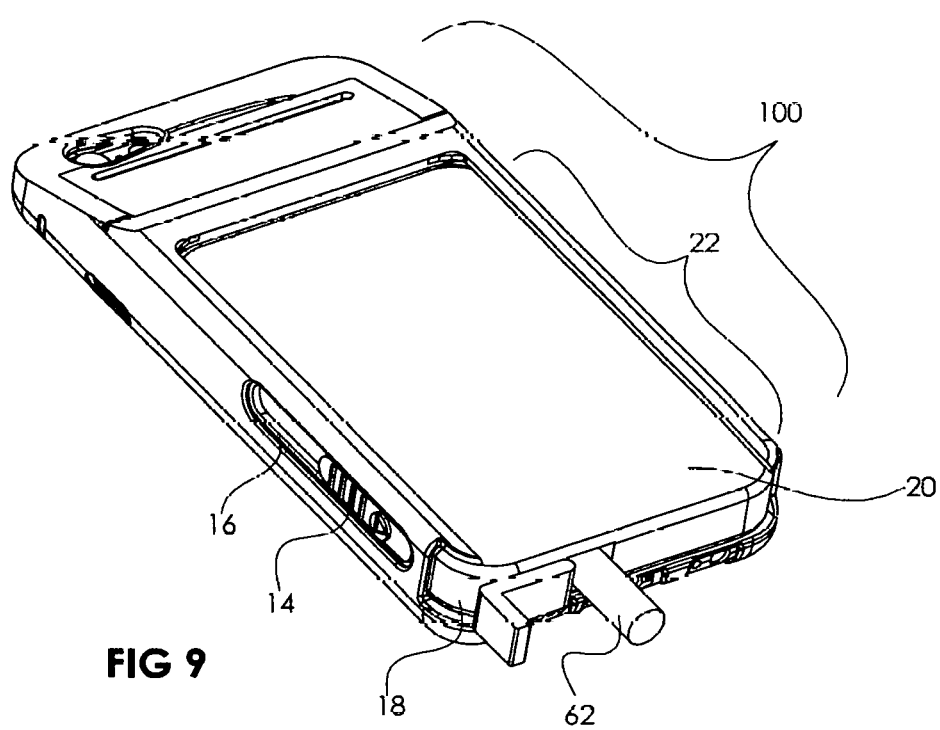
FIG. 9 is a perspective view of the invention with the cigarette case inserted into the secondary housing retainer.

FIG. 9 is a perspective view of the invention 100 with the cigarette case 20 installed in retaining portion 22. To have access to a cigarette, the user slides activator 14 which causes cigarette 62 to partially pop out.

Figure 10:
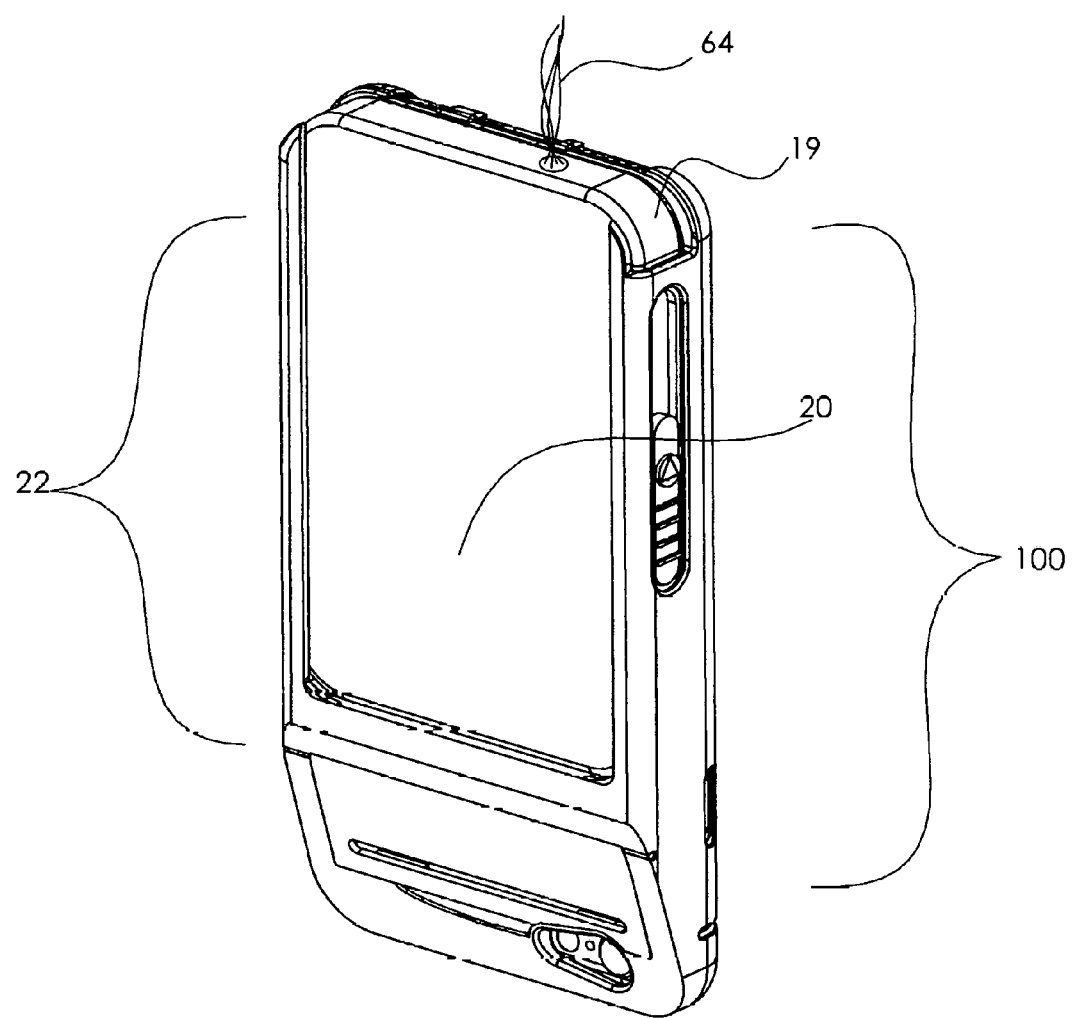
FIG. 10 is a perspective view of the invention showing the cigarette lighter function.

FIG. 10 is a perspective view of the invention 100 with cigarette case 20 installed in retaining portion 22. To have access to a cigarette lighter, the user slides activator switch 19 which causes flame 64 to exit the end of the case 20.

Figure 11:
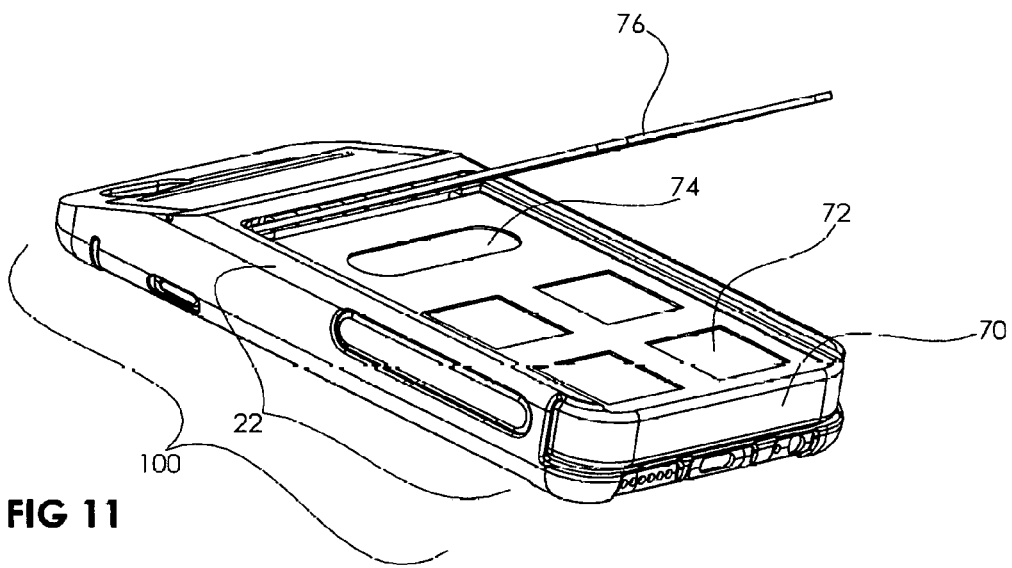
FIG. 11 is a perspective view of the invention showing the cosmetic case version of the invention.

FIG. 11 is a perspective view of the invention with a cosmetic case 70 installed in retaining portion 22. In this version of the case 70, powdered cosmetic portions 72 are held in place within the case 70, as well as a cosmetic applicator brush 74.

Figure 12:
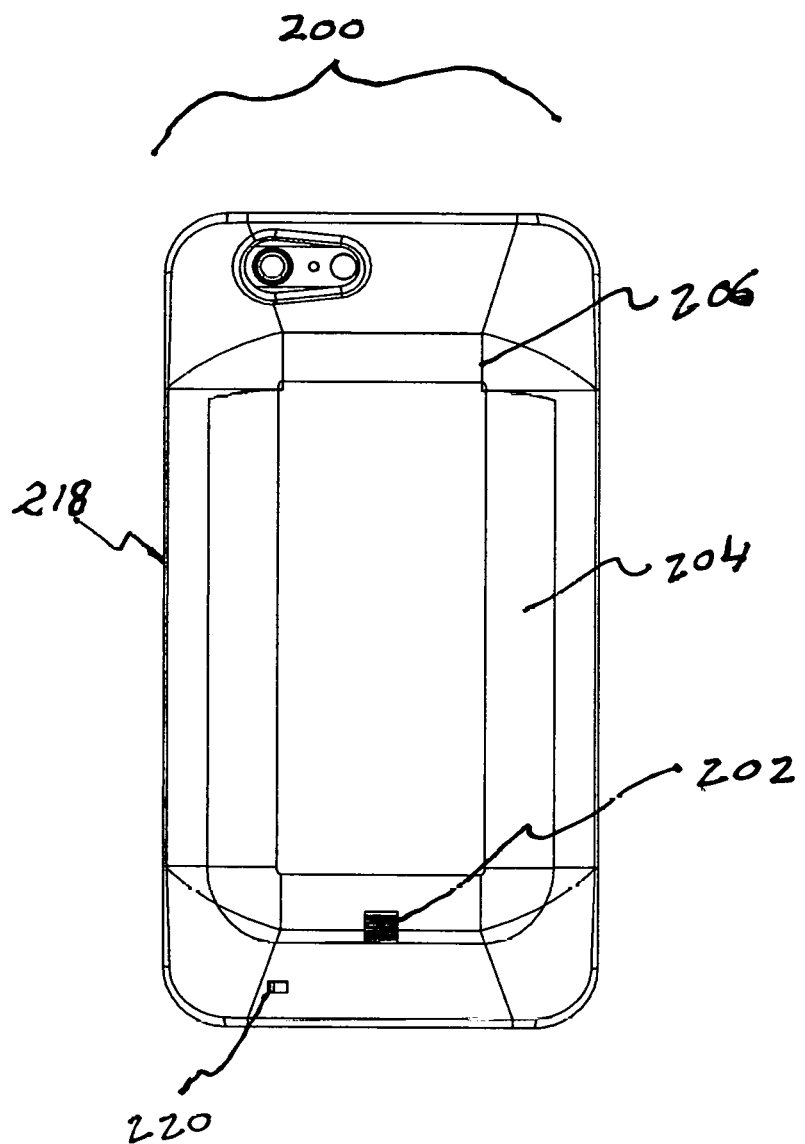
FIG. 12 is a rear view of a second embodiment of the invention.
Figure 13:
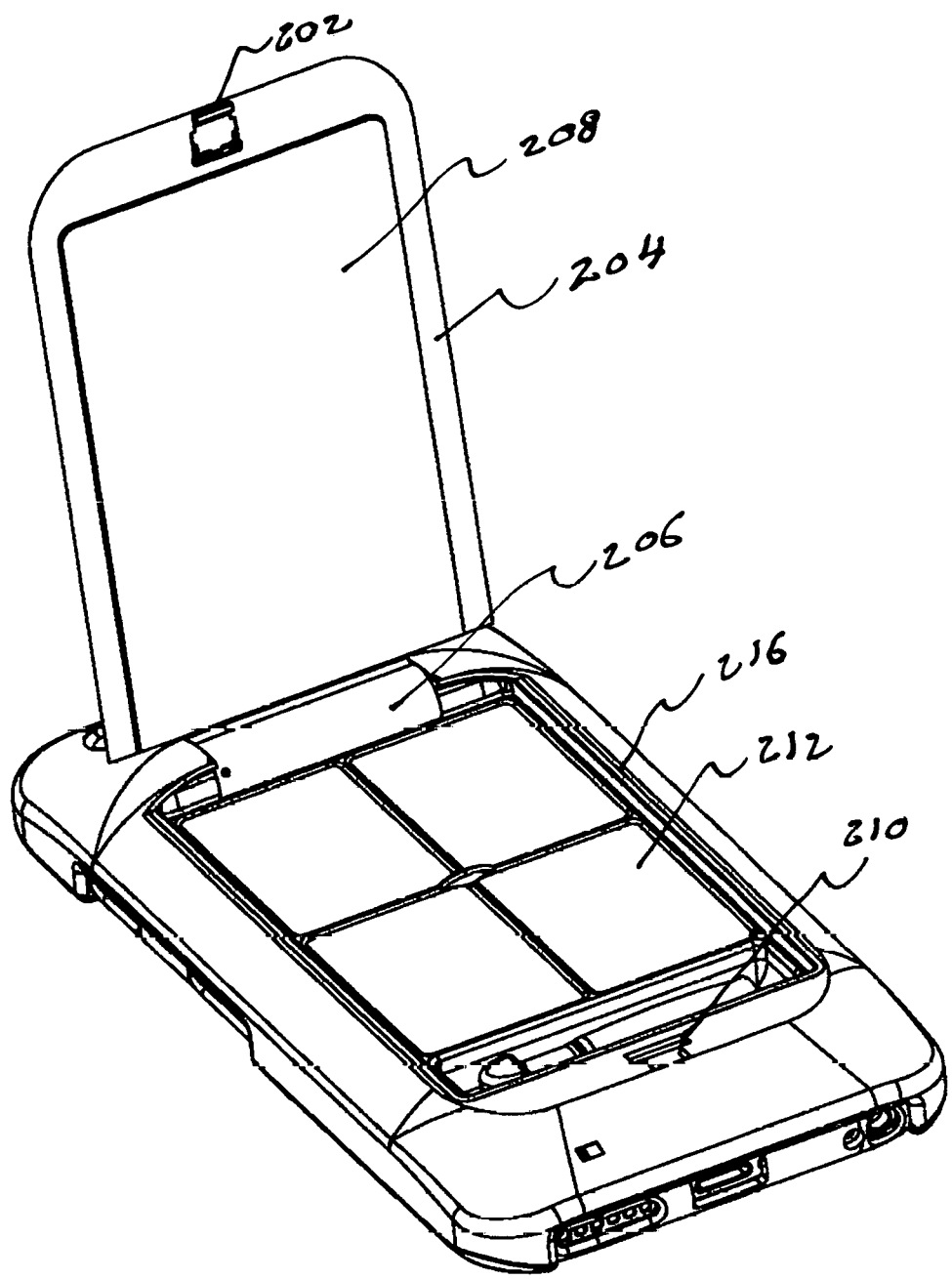
FIG. 13 is a perspective view of the second embodiment of the invention with the lid in the open position.
Figure 14:
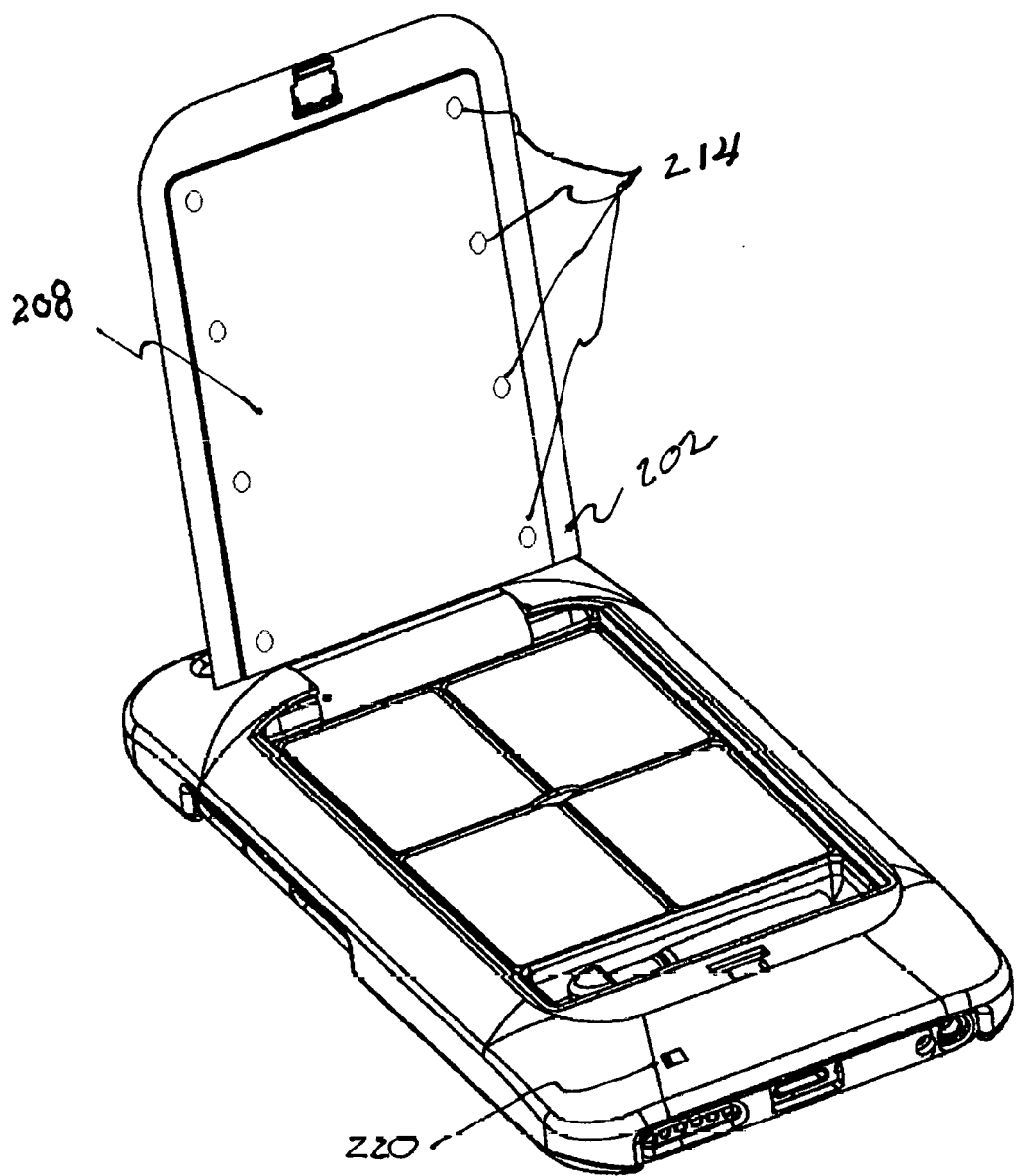
FIG. 14 is a perspective view of the second embodiment of the invention with LED lights included.
Figure 15:
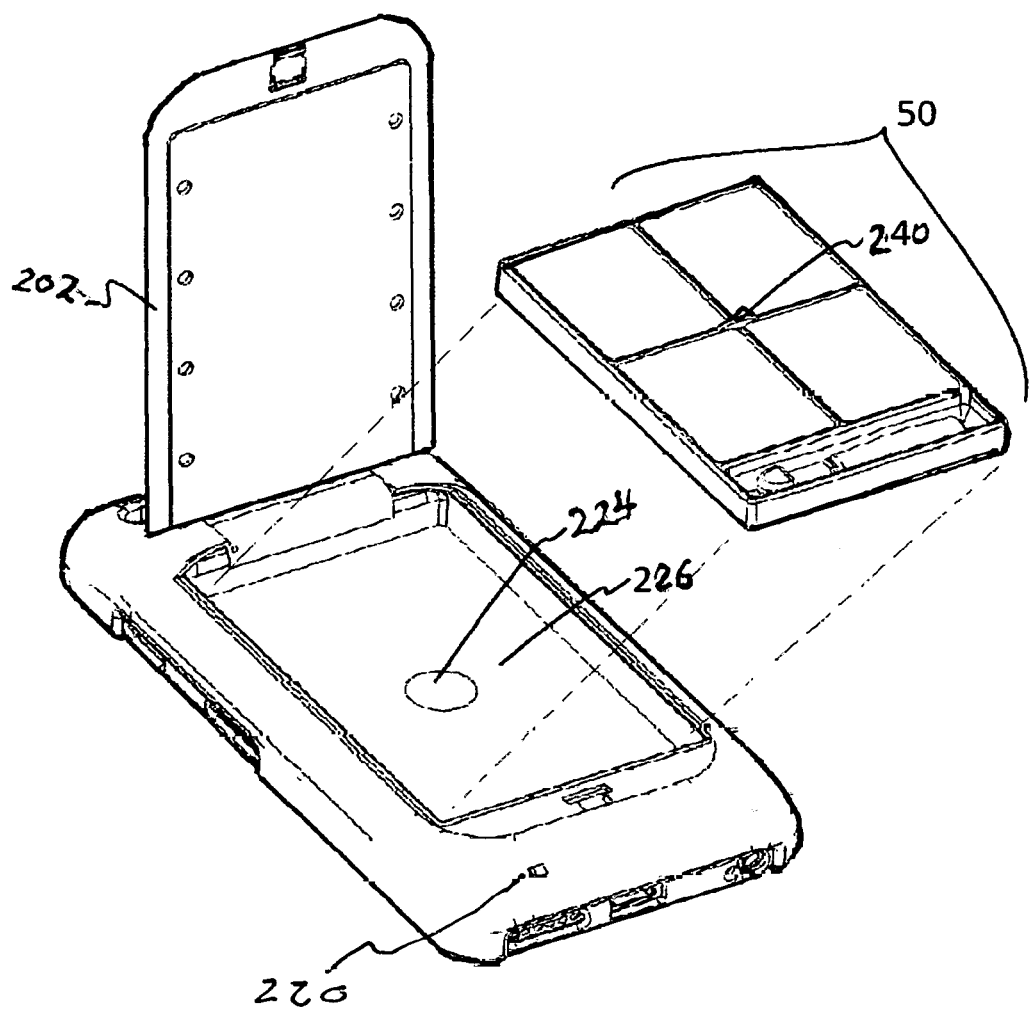
FIG. 15 is a perspective view of the second embodiment of the invention with the cosmetic tray removed.

FIG. 12 is a rear view of a second embodiment of the invention 200. The front view, not shown, is similar in all embodiments in that the face of a standard cell phone is seen surrounded by main case member 218. The second embodiment 200 includes a hinged pan 206 panel 204 which when raised exposes a removable cosmetic tray 500 as shown in FIGS. 13, 14 and 15. A spring biased unlocking member 202 can be operated by one hand. The hinge 206 of the cover plate 204 is also spring biased causing the cover plate 204 to rotate upwards automatically when the user pushes unlocking member 202. The interior of the second embodiment 200 as shown in the perspective view in FIG. 13 shows a mirror 208 fixedly attached to the inside of panel 204. A cosmetic tray 50 holds a variety of cosmetics 212 and a cosmetic applicator 210. A flexible gasket 216 surrounds the reservoir holding the cosmetic tray 50. When the cover panel 204 is placed down on the top of the reservoir, an air tight seal is created, thereby extending the life of the cosmetics 212 stored inside the case 200.

FIG. 14 is a perspective view of the second embodiment that includes a plurality of LED lights 214 mounted within the space between the cover plate 202 and the mirror 208. Clear non reflective areas in the mirror 208 allow the light from the LEDs 214 to shine outward and illuminate the face of the user during use. For this embodiment, batteries are stored within the main case housing. An on-off light switch 220 is mounted on the outer cover of the housing and is used to turn the LEDs 214 on and off.

FIG. 15 shows the cosmetic tray 500 removed. The underside of the tray 500 includes a ferrous metallic member that magnetically engages a magnet 224 located at the bottom of the reservoir 226. Cosmetic tray 50 includes a centrally located tab 240 that can be used to pull the tray 50 out from the reservoir 226. Various types of cosmetics can be installed and removed by removing one tray 50 and replacing it with another.

It, regarding the first embodiment 100, it should be noted that other cases 50 can be designed for specific purposes, such as a case for a cell phone charger, or a case for holding food items such as gum or candy.

The above description and associated Figures of the present invention 100 show a novel method of incorporating a secondary housing within a primary cell phone housing. The secondary housing 50 is removable and replaceable and the lid of the case 56 can be lifted without needing to remove the case 50 from the primary housing 100.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A phone case with insertable secondary housing comprising:
    a primary cell phone retaining case;
    a rectilinear secondary housing;
    said secondary housing including a hinged lid;
    a secondary housing receiver chamber fixedly attached to the underside of said primary cell phone retaining case;
    a third housing fixedly attached to the underside of said cell phone retaining case;
    a third housing fixedly attached to the underside of said cell phone retaining case;
    said third housing having a hinged lid allowing said outermost panel of said third housing to open or close;
    said third housing having a triangular cross section; and
    said secondary housing lid capable of being opened while said secondary housing is retained within said secondary housing receiving chamber.

2. A phone case with insertable secondary housing as claimed in claim 1, wherein said secondary housing includes space to hold a plurality of cigarettes, a cigarette lighter and cigarette dispenser.

3. A phone case with insertable secondary housing as claimed in claim 1 wherein said secondary case functions as a wallet.

4. A phone case with insertable secondary housing as claimed in claim 1 wherein said secondary case functions as a cosmetic case.

5. A phone case with insertable secondary housing as claimed in claim 1 wherein said secondary case functions as a battery charger housing.

6. A phone case with insertable secondary housing as claimed in claim 1 wherein the secondary housing is a tray that is removable and replaceable from a reservoir in said case and is concealed by the hinged cover plate.

7. A phone case with insertable secondary housing as claimed in claim 1 wherein a spring biased locking member can release said cover plate which is also spring biased so that said cover plate can be raised using only one hand.

8. A phone case with insertable secondary housing as claimed in claim 6 wherein said removable tray is retained by a magnet.

9. A phone case with insertable secondary housing as claimed in claim 6, wherein a flexible gasket creates an airtight seal between said hinged cover plate and reservoir.

* * * * *